United States Patent Office 3,179,899
Patented Apr. 20, 1965

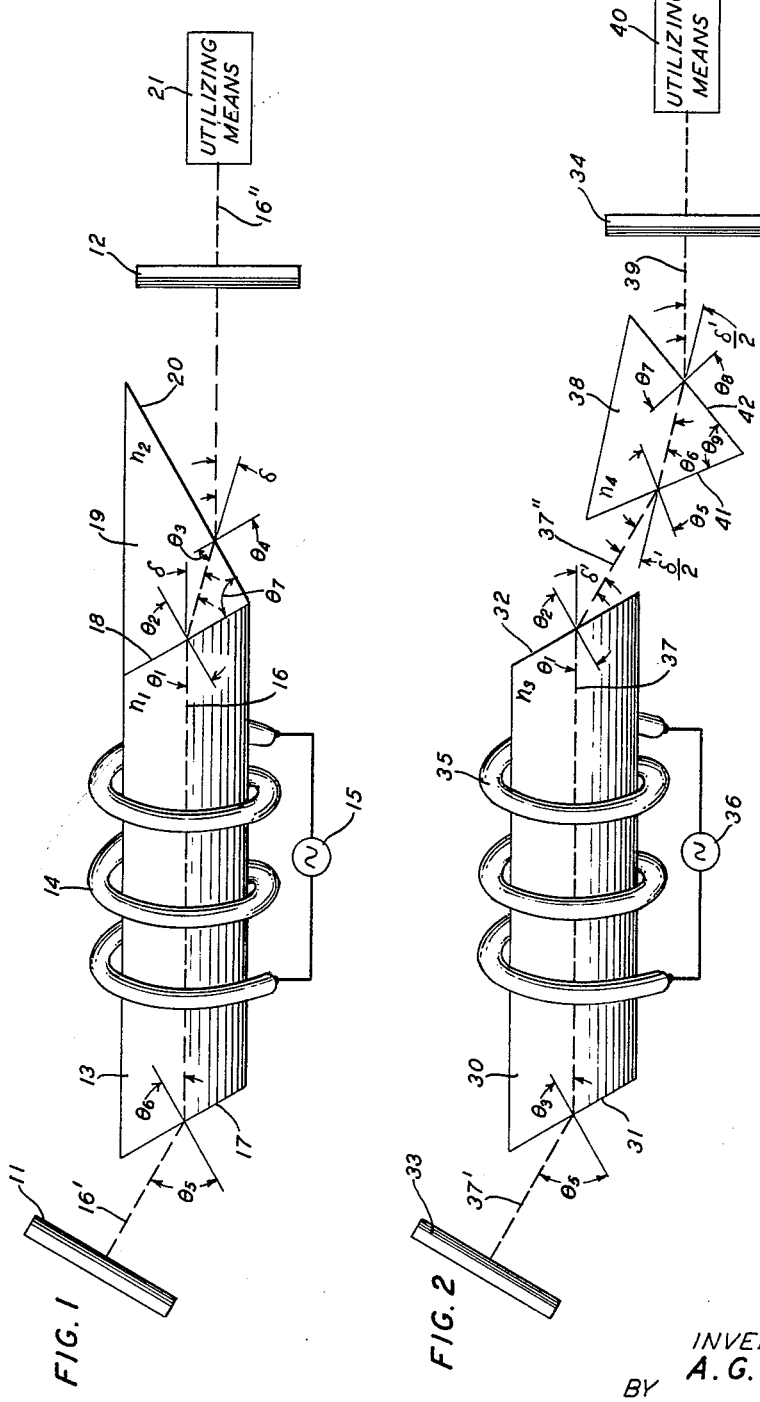

3,179,899
OPTICAL MASER COMPONENT
Arthur G. Fox, Rumson, N.J., assignor to Bell Telephone Laboratories, Incorporated, New York, N.Y., a corporation of New York
Filed Dec. 17, 1962, Ser. No. 244,990
6 Claims. (Cl. 331—94.5)

This invention relates to optical maser apparatus and more particularly to methods and means for coupling energy with low loss out of a solid state maser crystal along a propagation path parallel to the propagation path within the crystal.

It is now well known that amplification of electromagnetic wave energy can be achieved by stimulated emission from media in which there is produced a population inversion in a characteristic energy level system. Such media are generally referred to as negative temperature, or maser, media, and the amplification process is termed maser action or, simply "masing." The frequency range over which masing can be observed has been recently extended to the optical frequency range, the term optical maser, or laser, being employed to indicate the higher frequency range of operation.

One way to improve the efficiency of the interaction between the wave to be amplified and the negative temperature medium is to cause the wave to resonate in a cavity of appropriate dimensions which contains the medium. Since the wavelengths at the optical frequencies of interest are too small to permit cavity dimensions to be of the order of one wavelength, as is typically the procedure at microwave frequencies, it is necessary to utilize cavities having dimensions which are many thousands of times larger than the wavelengths involved.

Several cavity structures have been successfully employed in optical maser devices, among which are plane parallel reflective surfaces separated by a convenient gap, and concave spherical reflective surfaces also spaced apart by an appropriate gap. The reflectors are positioned with respect to each other and with respect to the negative temperature medium in such a way that light waves are multiply reflected between the reflectors, traveling through the active medium on each passage therebetween. During each such passage, amplification occurs via interaction with the excited atomic or molecular resonators within the maser medium. In addition, attenuation due to scattering by inhomogeneities in the medium occurs. At the reflectors, additional energy is lost due to the finite conductivity of the surface material, diffraction effects at the surfaces, and intentional energy coupling from the cavity. It is of course apparent that the usefulness of the maser depends upon the associated energy losses being held to an amount less than the energy gain provided by maser action.

The operative devices in the optical maser field are broadly classified as either solid state, of which ruby masers and calcium tungstate masers are examples; or gaseous, of which helium-neon masers and pure noble gas masers are examples. It is with respect to solid state masers that the present invention has primary utility.

In a particularly preferred embodiment, maser action in the solid state optical maser occurs in an elongated paramagnetic crystalline member which is disposed between reflective end members which can be either a reflective layer deposited on the crystal extremities or a separate mirror spaced apart from the crystal. Due to the mechanical problems involved in grinding and polishing such specular end surfaces to the required fractional wavelength tolerances for flatness and parallelism, the external mirror positioning arrangement often appears more attractive.

In either case, however, it has been typical practice that one or both of the reflective cavity boundaries be at least partially transmissive. In this manner, substantially single frequency, phase-coherent energy can be abstracted from the cavity and is available for use with external circuit means.

One particular problem involved in the abstraction process is that of energy reflection at the dielectric interfaces between materials of high dielectric constant such as the maser crystal on the one hand and materials of low dielectric constant such as the surrounding medium, typically air, on the other hand. One technique for eliminating such reflection is to position a layer of dielectric material at the dielectric boundary, the material having an index of refraction equal to the geometric mean of the indices of refraction of the two media and a thickness equal to one quarter wavelength of the energy involved. Such a scheme is frequency dependent and it therefore presents critical thickness problems. A more advantageous technique, and one which has been widely applied in the optical maser field, involves inclining the dielectric interface with respect to the beam axis at an angle known in the art as the Brewster angle. When the Brewster angle condition is met, waves polarized in the plane of incidence are transmitted with negligibly low reflection over a wide frequency band. The Brewster angle in the crystal, $\theta$, is given by the expression $$\theta = \tan^{-1}\frac{n_2}{n_1}$$

where $n_2$ is the index of refraction of the external medium and $n_1$ is the index of refraction of the maser crystal material, both at the frequency of interest. This angle varies relatively slowly wth frequency and, therefore, grinding tolerances are not so strict as with the quarter wave plate technique.

Coupled with the above advantage associated with Brewster angle interfaces, however, is the less desirable result that the propagation direction of the light beam is changed upon passing through the interface.

In optical maser applications in which space conservation is of importance, such as optical frequency satellite repeaters or cases in which several maser rods are to be operated in series, an external light beam orientation parallel to the axis of the rod can be extremely desirable. Additionally, in research and developmental appplications, an output beam direction related to the rod axis by a nonzero acute angle is often undesirable from purely practical considerations involving equipment placement and optical bench space limitations.

It is therefore an object of the present invention to eliminate undesirable beam deflections associated with Brewster angle interfaces in optical maser applications.

It is a further object of the invention to couple wave energy from a solid state optical maser medium to a second medium with low reflection and with the same direction of propagation in both media.

In accordance with the present invention, it has been found that beam direction reorientation means characterized by particular physical and optical parameters can be combined with a optical maser crystal to produce with low attendant reflection a maser output beam which is parallel to the axis of the maser rod.

In general the reorientation means comprises a prismatic wedge of material oriented so that all surfaces crossed by the light beam are at the Brewster angle for the materials involved. In addition, the index of refraction of the wedge material, interrelated through the Brewster angle restriction and desired beam orientation, has a value between that of the maser crystal and its surrounding medium, typically air.

In accordance with one principal embodiment of the invention, a prismatic wedge of material is in contact with the end of the maser crystal and has an index of refraction which is the square root of the index of refraction of the maser crystal. The wedge angle is equal to 90°.

In accordance with a second principal embodiment of the invention, a prismatic wedge is spaced away from the end of the maser crystal. The index of refraction is related to that of the crystal through a mathematical relationship to be developed hereinafter. The wedge angle is twice the angle having a tangent equal to the reciprocal of the index of refraction of the wedge.

In the particular application involving a solid state maser surrounded by air and comprising chromium doped aluminum oxide, or ruby, having an index of refraction at 7000 A. of 1.76, the required indexes for the prismatic wedge are 1.33 for the contiguous wedge-crystal combination and 1.31 for the spaced combination. Typical materials for such an application include water; certain fluorine containing compounds of ammonium, potassium, and sodium; liquid nitrogen, and liquid ammonia.

The above and other objects of the present invention, and its various features and advantages, can be more readily understood from a consideration of the accompanying drawing in which FIGS. 1 and 2 are plan views of optical maser arrangements embodying the invention and from the detailed description thereof which follows.

Referring more particularly to FIG. 1, there is shown a solid state optical maser in accordance with the invention, comprising an interferometer cavity formed by reflective surfaces 11, 12, of which at least surface 12 is partially transmissive to permit the abstraction of energy from the cavity. Reflectors 11, 12 each comprise, for example, a plate of optical quality glass having a plurality of layers of dielectric material disposed on the surface thereof normal to the axis of the incident light beam. Typically, these dielectric layers alternately comprise magnesium fluoride and zinc sulfide and are each one quarter wavelength thick at the operating frequency. The transmittance of thirteen such layers is typically of the order of 0.3%. Alternatively, end reflector 11 can comprise a total internal reflection prism as disclosed in application Serial Number 206,827, filed July 2, 1962 by W. W. Rigrod, and assigned to the assignee of this application. In such an arrangement, transmittance loss at the prism reflector is zero and the overall performance of the optical maser is therefore increased.

Disposed within the cavity formed by the reflective end members 11, 12 is an elongated negative temperature medium 13, typically a paramagnetic crystalline rod such as chromium-doped aluminum oxide, which is characterized by an appropriate energy level system for optical maser action. Advantageously, the energy level systems include a pair of levels between which a metastable population inversion can be at least intermittently established, the return of this system to normal equilibrium upon proper stimulation being accompanied by the emission of linearly polarized electromagnetic wave energy in the optical frequency range. The proper stimulation of emission is provided by flash lamp 14, which encircles rod 13 and which is intermittently energized by source 15. It is to be understood, of course, that the present invention is by no means limited to intermittently operating optical masers, but has equal application in continuously operating embodiments.

Emission stimulated within rod 13 and iteratively reflected between end members 11, 12 propagates therein along optical beam axis 16. The end surfaces 17, 18 of rod 13 are disposed at Brewster angles $\theta_6$, $\theta_1$ respectively. As stated hereinbefore, rod 13 is dimensioned such that the optical beam is incident upon the dielectric interfaces at the Brewster angle regardless of the direction of beam travel. Since the emission stimulated within rod 13 is linearly polarized with the polarization lying in the plane of incidence upon the interfaces, losses through reflections are minimized. For energy traveling into rod 13 through interfaces 17, 18, angles $\theta_5$, $\theta_2$ respectively correspond to the Brewster angle.

As seen in FIG. 1, energy leaving medium 13 at interface 17 is deflected by virtue of the dielectric constant differential between that of medium 13 and that of the surrounding medium, which is typically air. Reflecting end member 11 is positioned normal to the energy beam, now propagating along and parallel to axis 16'. In FIG. 1, complete reflection is desired at reflector 11, and accordingly no provision for output coupling is provided. At reflector 12, however, an output beam is desired, and is typically obtained by virtue of the finite transmittance of reflector 12. The transmitted beam travels to utilizing means 21 which can be further optical circuitry. However since it is often desired that the output beam axis and the beam axis within negative temperature medium 13 be parallel, and since the effect of the dielectric interface between medium 13 and its surrounding medium is to introduce a deflection in beam direction, it is necessary to eliminate the deflections. To this end, in accordance with the present invention, optical compensating wedge 19 is positioned contiguous and in contact with end surface 18 of medium 13.

Wedge 19 comprises a material which is optically transparent at the frequencies of interest and which has an index of refraction $n_2$ which will be specifically defined hereinafter. The wedge angles are determined by the indices of refraction of the wedge, the negative temperature medium, and the medium into which the light beam exits from the wedge; and by the constraint that all wedge surfaces through which the optical light beam passes be oriented at the reflectionless Brewster angle.

The Brewster angle at a dielectric interface is defined as the angle whose tangent equals the ratio of the refractive indices of the media into which and out of which the beam travels. Thus, in FIG. 1, $$\tan \theta_1 = \frac{n_2}{n_1}$$

$$\tan \theta_2 = \frac{n_1}{n_2}$$

where $n_1$ is the index of refraction of negative temperature medium 13 and $n_2$ is the index of refraction of wedge 19. The angle $\delta$, which is the beam deviation caused by the dielectric interface at crystal end surface 18, is trigonometrically defined as $\theta_2 - \theta_1$. It is the deviation $\delta$ which is to be compensated by wedge 19. Thus, $$\tan \delta = \tan (\theta_2 - \theta_1) = \frac{\tan \theta_2 - \tan \theta_1}{1 + \tan \theta_2 \tan \theta_1}$$

$$\tan \theta_1 = \frac{1}{2}\left(\frac{n_1}{n_2} - \frac{n_2}{n_1}\right) \qquad (1)$$

At surface 20 of wedge 19, at which the beam 16'' emerges into a third medium, typically air with a unity refractive index, the Brewster angle constraint requires that $$\tan \theta_3 = \frac{1}{n_2}$$

$$\tan \theta_4 = \frac{n_2}{1}$$

and $\delta = \theta_4 - \theta_3$.

Thus $$\tan \theta = \tan (\theta_4 - \theta_3) = \frac{n_2^2 - 1}{2n_2} \qquad (2)$$

Equalizing 1 and 2 and solving, $$n_1 = \sqrt{n_1} \qquad (3)$$

the condition for which contiguous wedge 19 will effect zero net beam deviation with Brewster angle constraints effective at all surfaces traversed by the beam.

From geometrical considerations, it is seen that $\theta_7$, the "wedge angle" is equal to $\theta_1 + \theta_4$.

$$\tan \theta_7 = \tan (\theta_1 + \theta_4) = \frac{\tan \theta_1 + \tan \theta_4}{1 - \tan \theta_1 \tan \theta_4}$$

Since $$(\tan \theta_1 \tan \theta_4) = \frac{n_2^2}{n_1} = 1$$

$\tan \theta_7$ is infinite and $\theta_7$ is a right angle.

Therefore, one means by which the emergent light beam of a Brewster angle solid state optical maser can be oriented parallel to the optic axis within the maser crystal, is to position an external 90° wedge of optically transparent material having an index of refraction equal to the square root of the index of refraction of the crystal material contiguous to the output surface of the maser.

Before proceeding to a consideration of practical wedge materials, the case of a noncontiguous compensating wedge will be considered. Such a configuration is illustrated in FIG. 2 in which negative temperature medium 30 having an index of refraction $n_3$ and Brewster angle end surfaces 31, 32 are disposed within a resonant cavity formed by reflectors 33, 34. The negative temperature medium is excited by flash lamp 35 which is energized by source 36. Within medium 30 the stimulated energy beam propagates along the axis indicated by dashed line 37. Outside medium 30, the propagation axes 37', 37'' are angularly related to axis 37 by reason of the beam deflection experienced upon traversing end surfaces 31, 32. Spaced away from end surface 32 and in the path of a light beam leaving medium 30 is compensating wedge 38 of optically transparent material having an index of refraction $n_4$. The surfaces of wedge 38 at which the beam enters and leaves are disposed at the Brewster angle to insure low reflection losses. Beam axis 37'' is seen in FIG. 2 to be related to beam axis 37 by an angle of deflection $\delta'$. Wedge 38 deviates the beam axis such that the emergent beam follows axis 39 between wedge 38 and reflector 34, axis 39 being parallel to axis 37 within negative temperature medium 30. Reflector 34 is illustrated as partially transmitting and a portion of a light beam propagating along axis 39 will propagate to utilizing means 40 which is typically further optical circuitry such as an optical detector or optical relay.

The Brewster angle constraint, assuming a surrounding medium of air, requires that $$\tan \theta_1 = \frac{1}{n_3}$$

and $$\tan \theta_2 = n_3$$

thus $$\delta' = \theta_2 - \theta_1$$

After manipulation, $$\tan \delta' = \frac{1}{2}\left(n_3 - \frac{1}{n_3}\right) \quad (4)$$

and $$\sin \delta' = \frac{n_3^2 - 1}{n_3^2 + 1} \quad (5)$$

Wedge 38 must bend the incident light beam through a total angle $\delta'$ and at the same time must present Brewster angle surfaces to the entering and emerging rays. Accordingly, and since the Brewster angle surfaces are exposed to the same medium, the beam bending at each of faces 41, 42 must be $$\frac{\delta'}{2}$$

From the geometry, $$\frac{\delta'}{2} = \theta_5 - \theta_6$$

since $$\tan \theta_5 = n_4$$

and $$\tan \theta_6 = \frac{1}{n_4} \quad (6)$$

$$\tan \frac{\delta'}{2} = \frac{1}{2}\left(n_4 - \frac{1}{n_4}\right) \quad (7)$$

Using the identities $$\tan \frac{\delta'}{2} = \frac{\sin \theta'}{1 + \cos \delta'}$$

and $$\cos \delta' = \sqrt{1 - \sin^2 \delta'}$$

and Equations 5 and 7, the refractive index of wedge 38 is found to be $$n_4 = \frac{(n_3 - 1) + \sqrt{2(n_3^2 + 1)}}{n_3 + 1} \quad (8)$$

The wedge angle $\theta_9$ is equal to $\theta_6 + \theta_7$. In the embodiment of FIG. 2, wedge 38 is symmetrical in view of the equal beam deviations required at faces 41, 42 and the refracting angle $\theta_9$ is therefore equal to $2\theta_6$ or, from Equation 6, $$\theta_9 = 2 \tan^{-1}\frac{1}{n_4}$$

where $n_4$ is defined in Equation 8.

A specific structure of substantial practical importance in the solid state optical maser field is the ruby maser. At the emission wavelengths of interest ruby material, chromium doped aluminum oxide, exhibits a relative dielectric constant of 1.76. For the contiguous crystal-wedge embodiment of FIG. 1, the refractive index $n_2$ of the compensating wedge 19 is, from Equation 3, $$n_2 = \sqrt{1.76} = 1.33$$

In the spaced crystal-wedge combination of FIG. 2, from Equation 8

$$n_4 = 1.31$$

It is therefore apparent that materials typically used in prior optical wedges, such as for example, silicate flint glass with an approximate index of refraction of 1.61 or silicate crown glass with an approximate index of refraction of 1.51 are unsuited for use in the instant combination. Accordingly, other materials must be employed. These materials not only must exhibit an index of refraction in the 1.31 to 1.33 range at the optical frequencies of interest but also must be substantially transparent. Typical of such materials are water and sodium fluoride.

In all cases it is understood that the above described arrangements are illustrative of a small number of the many possible specific embodiments which can represent applications of the principles of the present invention. Numerous and varied other arrangements can readily be devised in accordance with these principles by those skilled in the art without departing from the spirit and scope of the invention. Thus, for example, solid state optical masers employing calcium tungstate, barium fluoride, calcium fluoride, or other suitable material as the active crystal material can be substituted for the ruby crystal referred to in the specific embodiments.

What is claimed is:

1. In combination, an optical cavity having light ray reflective end members forming the boundaries thereof,
    a solid state negative temperature medium having an index of refraction $n_1$ interposed between said members and disposed about an axis of optical propagation therebetween,
    opposite ends of said medium being inclined at the Brewster angle to said axis,
    and means for coupling a light beam from said negative temperature medium into a medium of substantially unity index of refraction with an axis of propagation in said last-recited medium which is parallel to said axis of optical propagation, said means comprising a homogenous light beam refracting medium having an index of refraction $n_2$ which is less than $n_1$ positioned within said cavity in the path of the light beam emerging from at least one of said ends, each surface of said refracting medium through which light passes being disposed at the Brewster angle with respect to said axis of optical propagation.

2. The combination according to claim 1 in which said means and said negative temperature medium are contiguous and in which $n_2 = \sqrt{n_1}$.

3. The combination according to claim 1 in which said means and said negative temperature medium are spaced apart and in which $$n_2 = \frac{(n_1-1) + \sqrt{2(n_1^2-1)}}{n_1+1}$$

4. In combination with an optical cavity, means for coupling along a given direction a light beam from a solid state negative temperature medium disposed within said cavity and having Brewster angle end surfaces, said beam defining within said medium an axis of propagation parallel to said given direction, said means comprising a single wedge of optically transparent material having an index of refraction $n_2$ equal to or less than the square root of the index of refraction $n_1$ of said medium, said wedge being disposed within said cavity in the path of said beam external to said medium with the surfaces of said wedge upon which said beam enters and leaves inclined at the Brewster angle.

5. Means according to claim 4 in which said wedge and said medium are contiguous, $n_2 = \sqrt{n_1}$, and the wedge angle between said incident and emergent surfaces is 90°.

6. Means according to claim 4 in which said wedge and said medium are spaced apart, $$n_2 = \frac{(n_1-1) + \sqrt{2(n_1^2-1)}}{n_1+1}$$

and the wedge angle between said incident and emergent surfaces is twice the angle whose tangent is $$\frac{1}{n_2}$$

References Cited by the Examiner
UNITED STATES PATENTS 3,034,398  5/62  Barnes et al. _____ 88—14
3,057,248  10/62  Sherman _____ 88—14

OTHER REFERENCES

Sears: Optics, Addison-Wesley, 3rd Ed., Reading, Mass., 1949, pages 47 to 52 and page 59.

Jenkins et al.: Fundamentals of Optics, McGraw-Hill, 2nd Ed., New York 1950, pages 32 to 34.

Rigrod et al.: Gaseous Optical Maser with External Concave Mirrors, Journal of Applied Physics, vol. 33, No. 2, February 1962, pages 743 and 744.

JEWELL H. PEDERSEN, *Primary Examiner.*